Figures 1, 2:
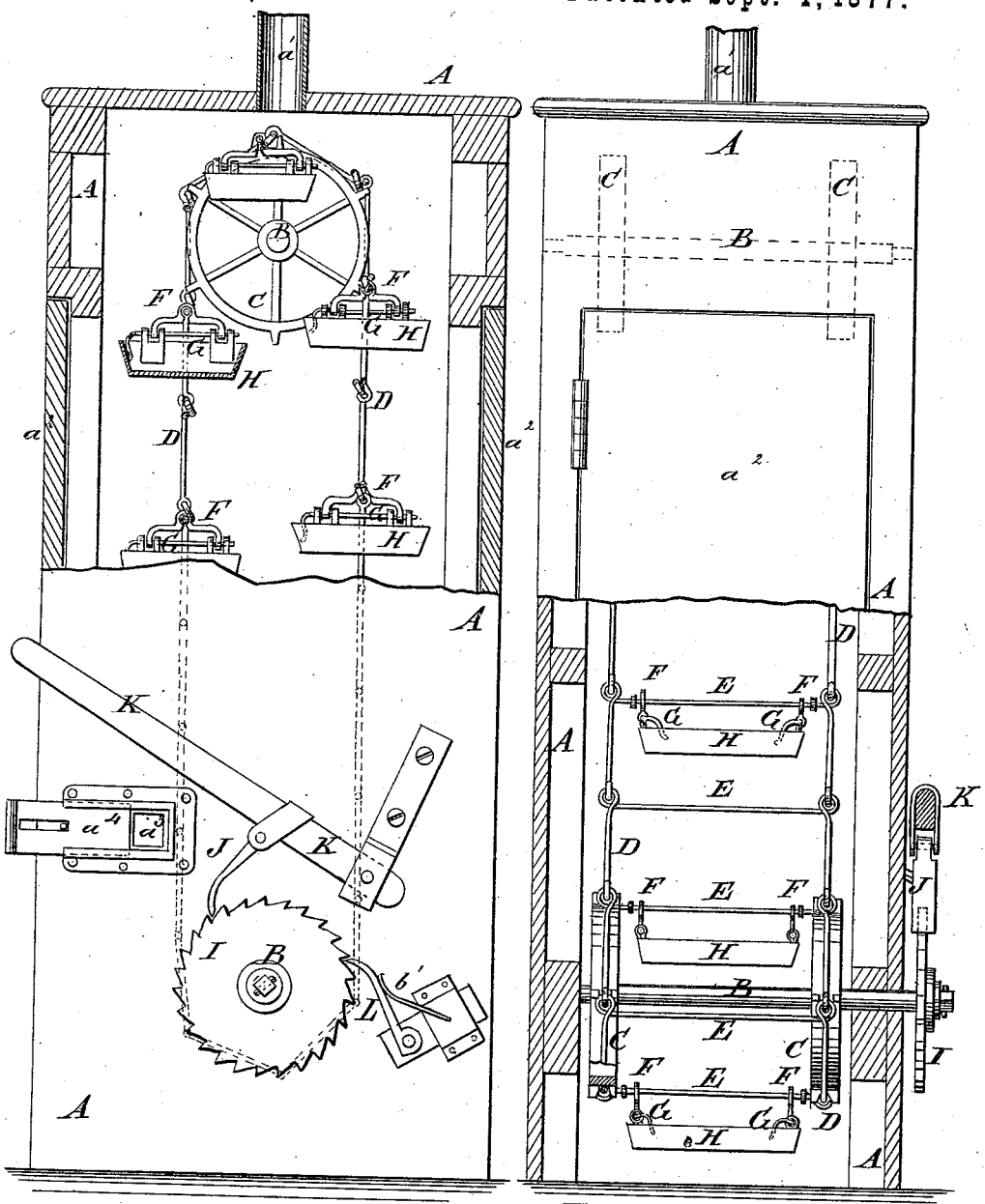

W. W. FERGUSON.
FRUIT-DRIERS.

No. 194,813. Patented Sept. 4, 1877.

WITNESSES:    INVENTOR:
W. W. Ferguson
BY
ATTORNEYS.

UNITED STATES PATENT OFFICE.

WILLIAM W. FERGUSON, OF HEALDSBURG, CALIFORNIA.

IMPROVEMENT IN FRUIT-DRIERS.

Specification forming part of Letters Patent No. 194,813, dated September 4, 1877; application filed May 12, 1877.

*To all whom it may concern:*

Be it known that I, WILLIAM WASHINGTON FERGUSON, of Healdsburg, in the county of Sonoma and State of California, have invented a new and useful Improvement in Revolving Fruit-Driers, of which the following is a specification:

Figure 1 is a side view of my improved machine, part of the case being broken away to show the construction. Fig. 2 is a front view of the same, part of the case being broken away to show the construction.

Similar letters of reference indicate corresponding parts.

The object of this invention is to furnish an improved machine for drying fruit, which shall be simple in construction, convenient in use, and effective in operation, drying the fruit evenly and rapidly, and which may be constructed at comparatively small cost.

The invention consists in the construction and arrangement of parts hereinafter described and claimed.

A is the case of the machine, which is designed to be placed over or connected with a furnace, and has a pipe, $a^1$, inserted in a hole in its top to allow the moisture from the fruit to escape. In the front and rear sides of the case A are formed large doors $a^2$ for convenience in putting in and taking out the fruit-pans, and to enable the machine to be cooled off quickly when the fruit is to be taken out.

To the upper and lower parts of the sides of the case A are pivoted two shafts, B, to each of which are attached two chain-wheels, C.

Around the chain-wheels C are passed two endless chains, D, which are connected at suitable distances apart by cross-rods E. The rods E pass through eyes at the centers of the cross-bars F, two to each rod E.

The ends of the cross-bars F are bent downward, and have eyes formed in them to receive the pins G, which also pass through eyes formed upon or attached to the upper edges of the ends of the fruit-pans H. By this construction the pans H will always be right side up.

The pans H may be made with close bottoms; but I prefer to make them with woven-wire bottoms of such a fineness of mesh that the fruit cannot pass through.

A ratchet, I, is fixed on one end of shaft B, and a pawl, J, pivoted to lever K, engages with it, as shown.

The ratchet-wheel I is kept from turning back by a holding-pawl, L, having a spring, $b'$.

The machine may be driven by steam-power or horse-power, or other power, as may be desired or convenient.

In the side of the case A, near the lever K, is formed an opening, $a^3$, closed by a slide, $a^4$, to enable the fruit to be conveniently tested.

Having thus described my invention, I claim as new and desire to secure by Letters Patent—

1. The combination of the swinging bars F and the pins G with the cross-rods E attached to the endless chains D for connecting the fruit-pans H detachably with said chains, substantially as herein shown and described.

2. The combination of the ratchet-wheel I, the pawls J and L, and the lever K with the shaft B of the fruit-drier and with the case A, substantially as herein shown and described.

WILLIAM WASHINGTON FERGUSON.

Witnesses:
GEORGE R. HUDSON,
W. W. MORELAND.